Patented Aug. 6, 1940

2,210,039

UNITED STATES PATENT OFFICE 2,210,039

METHOD OF MAKING DIAMOND TOOLS

John L. Petrie, Detroit, Mich., assignor to Wheel Trueing Tool Company of Delaware, Detroit, Mich., a corporation of Delaware No Drawing. Application April 10, 1939, Serial No. 267,179

9 Claims. (Cl. 51—280)

This invention relates to a method of making diamond tools, such as wheel trueing and dressing tools, bits and drills, diamond wheels, saws, dies and the like.

It has heretofore been proposed, as in the Willey Patent No. 2,074,038, to subject a mixture of tungsten, carbon, nickel and diamond to heavy pressures up to 50,000 lbs. per sq. in. and to high temperatures up to 2,000° C. to effect an alloying of the ingredients, and more particularly to cause the tungsten to react with the carbon of the surface of the diamonds to form a tungsten carbide layer encasing the diamonds. Such a process, however, possesses inherent disadvantages due to the extremely high pressures and temperatures that are involved. At the high temperatures employed, there is a serious likelihood of impairing or even destroying the properties of the diamonds.

Furthermore, the formation of tungsten carbide in the matrix, due to the reaction between the tungsten and the free carbon in the initial mixture, imparts such a high degree of hardness to the matrix as to impair the usefulness of the tool for certain purposes, as in the trueing or dressing of wheels. For those purposes, tools containing a substantial proportion of tungsten carbide in the matrix have been found to be objectionable in many instances because imparting a glazed effect to the wheel or stone that is being dressed, instead of giving the wheel or stone free cutting properties.

The method of my present invention avoids the enumerated disadvantages by using materially lower pressures and temperatures, by heating tungsten metal with diamonds in the absence of appreciable quantities of other elements, particularly carbon, so as to prevent the formation of substantial quantities of tungsten carbide throughout the body of the matrix, and by employing a relatively low melting point brazing material as bonding material for the tungsten particles and diamonds, rather than employing high melting point alloying ingredients, such as nickel.

I have found quite unexpectedly that at temperatures as low as 1950 to 2100° F., without the use of simultaneous pressure, free tungsten metal can be caused to react with the carbon of the surface of a diamond to form a strongly adherent, thin film or layer containing tungsten carbide. Such a layer is so firmly bonded to the surface of the diamonds, when formed in accordance with the method of my invention, as to be incapable of being removed therefrom by a mechanical brushing action. The formation of this adherent surface film or layer is furthered, according to my observation, by the use of a carbon or hydrogen reduced tungsten powder and by employing a hydrogen atmosphere during the heating of the tungsten powder and diamonds. Furthermore, if the tungsten powder and diamonds are heated substantially by themselves, in the absence of appreciable quantities of any other metals, such as metals of the iron group, a more continuous surface layer containing tungsten carbide is formed on the diamonds at temperatures below 2100° F. and without the necessity of employing simultaneous pressure.

I therefore carry out the method of my invention in two heating stages, in the first of which a mass of finely comminuted tungsten metal and the desired quantity of diamonds is heated substantially by itself at a temperature in general below 2100° F. and for a period of time sufficient to effect the formation of the surface layer referred to, and in the second of which stages the mass of metallic tungsten particles and diamonds is heated to a temperature in the neighborhood of 2100° F. in contact with a brazing material having a melting point below that temperature, so that the brazing material is caused to melt and flow by capillary action into the interstices of the mass to bond the whole together. Various brazing materials, such as German silver and silver solder, have been found to form an excellent bond between the tungsten carbide containing surface layer on the diamonds and the particles of tungsten metals, and between the tungsten metal particles themselves.

It is therefore an important object of this invention to provide an improved method for making diamond tools, wherein lower pressures and temperatures may be satisfactorily employed than have heretofore been found necessary.

It is a further important object of this invention to provide a method of making diamond tools and the like that involves two heating stages, in the first of which finely divided tungsten metal is heated substantially by itself with the desired quantity of diamonds at a relatively low temperature and in the absence of a compressive force, and in the second of which relatively low melting point brazing material is caused to flow into the interstices of the mass to bind the particles and diamonds together.

Other and further important objects of this invention will become apparent from the following description and appended claims.

In practicing the method of my invention, tungsten powder and diamonds are placed in a suitable upright holder and compressed under a substantial pressure, which may suitably be in the neighborhood of 1000 lbs. per sq. in. in the case of trueing and dressing tools, and drills. In making bits, it is preferable to use a graphite holder for the mass of tungsten powder and diamonds, and in that case it is preferable to use a compressive force of not over about 500 lbs. per sq. in., owing to the inherent weakness of the graphite holder.

Both carbon reduced and hydrogen reduced tungsten can be employed in my method, but I have found that a more satisfactory tool is, in general, produced when using hydrogen reduced tungsten. This is particularly true when the brazing material employed is a German silver solder. The tungsten should be in a finely comminuted state, preferably such that all of it will pass through a standard 200 mesh screen.

In placing the tungsten powder and diamonds in the holder, the diamonds may be positioned in the mass of tungsten powder in any desired arrangement or design, but the diamonds should be so spaced from each other and from the walls of the holder as to provide a cushion of the tungsten powder therebetween. While I prefer to use whole diamonds of good quality, it is nevertheless possible to use diamond particles or diamonds of inferior quality, collectively known as bort.

Under a compressive force in the neighborhood of 1,000 lbs. per sq. in., a mass of 200 mesh tungsten powder and diamonds will usually be compressed to about ½ of the original volume of the mass. While higher pressures will result in somewhat greater compression, they have not been found to be necessary. The purpose of compressing the mass of tungsten powder and diamonds is to increase the surface contact between the tungsten particles and the surfaces of the diamonds and decrease the volume of voids within the mass to a minimum, so that the least possible quantity of brazing material will suffice to bond the entire mass together.

In the preferred embodiment of my method, a slug of brazing material is placed in the holder above the compressed mass of tungsten powder and diamonds, and the holder and contents then subjected to a sufficiently high temperature, in a hydrogen atmosphere, to effect the desired reaction between the tungsten metal and the carbon of the diamonds, without, however, causing the slug of brazing material to melt. Alternatively, the brazing material may be omitted entirely during the first heating stage, and the compressed mass of tungsten powder and diamonds heated together at a sufficiently elevated temperature, but below that at which any destrucion of the diamond takes place, and for a sufficiently long period of time to effect the formation of a strongly adherent layer containing tungsten carbide over the surfaces of the diamonds.

In accordance with the preferred form of my invention, a slug of brazing material sufficient to give an excess over the amount of brazing material required, is placed above the compressed mass of tungsten powder and diamonds in the holder. Ordinarily, one part of brazing material to four parts of tungsten powder by weight is sufficient. The prepared holder containing the compressed mass of diamonds and tungsten, and slug of brazing material, is then placed in a furnace providing a hydrogen atmosphere and maintained at a temperature of about 1950 to 2020° F. This is the preferred temperature range when the brazing material is copper or a copper containing alloy, such as a German silver, or a silver solder. Slightly higher or slightly lower temperatures may be employed, depending upon the brazing material used, but where the brazing material is present during the first heating stage, the temperature should be kept below that sufficient to melt the brazing material, so that the reaction between the tungsten metal and diamond may take place in the absence of any appreciable amount of other elements or metals. Where the brazing material is not present during the first heating stage, as in the alternative step described above, substantially higher temperatures than 1950 to 2020° F. may be employed, but it is generally undesirable to go much above 2100° F.

The first heating stage requires about 30 minutes at a temperature of 1950 to 2020° F. in order to expel oxygen containing gases from the mass of tungsten powder and diamonds and to effect the desired reaction between the tungsten metal and the carbon of the surfaces of the diamonds. In general, longer times will be required at lower temperatures and shorter times at higher temperatures, but the conditions should be so regulated that a strongly adherent film or layer containing tungsten metal and tungsten carbide is formed on the surfaces of the diamonds. Under the correct conditions of time and temperature, the layer so formed will be such an integral part of the diamonds as to be incapable of removal by mechanical brushing. The adherence of the layer of tungsten metal and tungsten carbide to the surfaces of the diamonds is enhanced by the pitting effect produced on such surfaces by the action of the tungsten metal at the temperatures employed. There is thereby obtained an interlocking action between the tungsten metal and the diamonds proper that is caused by the chemical reaction therebetween and the consequent penetration of the tungsten particles into the superficial surfaces of the diamonds.

It is not necessary that the first heating stage be carried out in a hydrogen atmosphere, so long as air or other oxygen containing gases are excluded. A hydrogen atmosphere is nevertheless much to be preferred.

In the second heating stage, the furnace temperature is raised to within the limits of 2050 to 2100° F., or thereabouts, depending upon the particular brazing material that is being used. In the case of German silver or silver solder, the limits of temperature are preferably those just stated, since within those limits either German silver or silver solder will melt and flow readily by gravity and capillarity into the voids of the mass of tungsten particles and diamonds. No compressive force is employed during the second heating stage, and the heating is continued for a period only sufficient to insure thorough penetration of the molten brazing material into the voids of the mass of tungsten particles and diamonds. Ordinarily, the second heating step is completed within 10 minutes of heating at a temperature within the specified limits.

If the first heating step has been carried out in accordance with the alternative method, above described, the slug of brazing material is positioned in the holder containing the diamonds and tungsten particles before subjecting the holder and contents to brazing temperatures. In either case, the brazing operation is preferably carried out in a hydrogen atmosphere, so that the same furnace may be used for both heating stages.

As already stated, various brazing materials may be satisfactorily employed, including copper, brass, bronze, and alloys containing substantial proportions of copper, such as silver solder and German silver. An analysis of silver solder that has been found most satisfactory is the following: 75% copper, 5% zinc, and 20% silver.

Using hydrogen reduced tungsten, I have found it preferable to employ a German silver consisting of 75 copper, 5% zinc, and 20% nickel. A German silver of this composition has been found to "wet" the tungsten carbide containing layer over the surfaces of the diamonds, better than it "wets" the surface of the diamond itself. Since the German silver also "wets" the particles of tungsten metal forming the matrix, a very strong bond between the diamonds and the matrix and between the tungsten particles of the matrix is thereby formed.

Upon the completion of the second heating stage, the tool is cooled in the hydrogen furnace, preferably to about 1200° F., and then removed and air cooled to room temperature. The finished tool comprises a matrix of tungsten particles bonded together by the brazing material that fills the voids and interstices between the tungsten particles. By virtue of the initial compression step, the volume of the voids, and hence the weight of brazing material necessary to fill them, are reduced to a practical minimum. This is important, since a large proportion of relatively soft brazing material would tend to give too soft a matrix. In the case of a tool prepared in accordance with my method, however, the matrix is hard enough to impart the desired toughness and strength to the tool, while not sufficiently hard to impart a glazing effect to the surface of the wheel that is being dressed. The lack of any glazing effect is due to the substantial absence of any tungsten carbide from the body of the matrix of the tool. Upon use of tools made in accordance with my method, they have been found to be tough, ductile, and resistant to shearing action.

It will, of course, be understood that various details of the process may be varied through a wide range without departing from the principles of this invention and it is, therefore, not the purpose to limit the patent granted hereon otherwise than necessitated by the scope of the appended claims.

I claim as my invention:

1. The method of making a diamond tool, which comprises compressing together substantially by themselves finely comminuted tungsten metal and at least one diamond, the diamond being surrounded by and in direct intimate contact with said tungsten metal, heating the resulting compacted mass out of contact with the atmosphere to expel oxygen therefrom and continuing said heating for a sufficient period of time at an elevated temperature below 2100° F. to effect the formation on the surface of said diamond of a strongly adherent tungsten carbide containing film, subsequently without the application of pressure and at a temperature not substantially higher than 2100° F. introducing molten brazing material into the interstices of said mass by capillarity and gravity and cooling to bond said mass into an integral whole.

2. The method of making a diamond tool, which comprises subjecting a mass consisting essentially of finely comminuted tungsten metal and a desired quantity of diamonds surrounded by and in direct intimate contact with said tungsten metal to a substantial pressure not exceeding about 1000 lbs. per sq. in. to compact said mass, heating said compacted mass out of contact with air to an elevated temperature sufficient to effect the formation on the surface of said diamonds of a strongly adherent layer containing tungsten carbide, but below a temperature that would result in any appreciable destruction of the diamonds and subsequently without the application of pressure and without heating said mass above 2100° F. introducing molten brazing material into the interstices of said mass while confined in a hydrogen containing atmosphere.

3. The method of making a diamond tool, which comprises subjecting a mass consisting essentially of finely comminuted particles of reduced tungsten metal and a desired quantity of diamonds surrounded by and in direct intimate contact with said tungsten metal to a pressure of about 1000 lbs. per sq. in. to compress the same, heating said compressed mass in a hydrogen atmosphere for such a period and at such an elevated temperature as to effect a reaction between the carbon of the diamonds and the tungsten metal forming a strongly adherent surface layer containing tungsten carbide, but below a temperature that would result in any appreciable destruction of the diamonds and thereafter while still in a hydrogen atmosphere introducing molten brazing material into said mass without the application of pressure to fill the interstices of said mass by capillarity, said brazing material having a strong bonding action toward said tungsten particles and said tungsten carbide containing layer.

4. The method of making a diamond tool, which comprises subjecting a mass consisting essentially of finely comminuted particles of reduced tungsten metal and a desired quantity of diamonds surrounded by and in direct intimate contact with said tungsten metal to a pressure of about 1000 lbs. per sq. in. to compress the same, heating said compressed mass in a hydrogen atmosphere for such a period and at such an elevated temperature as to effect a reaction between the carbon of the diamonds and the tungsten metal forming a strongly adherent surface layer containing tungsten carbide, but below a temperature that would result in any appreciable destruction of the diamonds and thereafter while still in a hydrogen atmosphere heating said mass in contact with a slug of brazing material to a temperature of about 2100° F. without the application of pressure to melt said brazing material and cause the same to flow into and to fill the interstices of said mass by capillarity, said brazing material having a strong bonding action toward said tungsten particles and said tungsten carbide containing layer.

5. The method of making a diamond tool, which comprises subjecting a mass consisting essentially of finely comminuted particles of reduced tungsten metal and a desired quantity of diamonds surrounded by and in direct intimate contact with said tungsten metal to a pressure of about 1000 lbs. per sq. in. to compress the same, heating said compressed mass in a hydrogen atmosphere for such a period and at such an elevated temperature as to effect a reaction between the carbon of the diamonds and the tungsten metal forming a strongly adherent surface layer containing tungsten carbide, but below a temperature that would result in any appreciable destruction of the diamonds and thereafter while still in a hydrogen atmosphere introducing molten brazing material into said mass without the application of pressure to fill the interstices of said mass by capillarity, said brazing material comprising an alloy of about 75% copper, 5% zinc and the balance a metal selected from the group consisting of silver and nickel.

6. The method of making a diamond tool, which comprises subjecting a mass consisting essentially of finely comminuted particles of hydrogen reduced tungsten and diamonds to a substantial pressure to compress the same, the diamonds being embedded in said tungsten particles and in direct intimate contact therewith, heating said compressed mass out of contact with air for such a period of time and at such an elevated temperature as to form on the surface of the diamonds a strongly adherent layer containing tungsten carbide, but below a temperature that would result in any appreciable destruction of the diamonds subsequently heating said mass to a temperature not over about 2100° F. without application of pressure thereto in contact with a brazing material to cause said brazing material to flow by capillary action into the interstices of said mass to bond the whole together, and cooling said bonded mass.

7. The method of making a diamond tool, which comprises placing a mass of finely comminuted tungsten metal and diamonds in a holder with all surfaces of said diamonds in direct intimate contact with said tungsten metal, compressing said mass under substantial pressure up to about 1000 lbs. per sq. in., releasing said pressure, placing brazing material on said compressed mass, heating said mass and brazing material in a hydrogen atmosphere to an elevated temperature below the melting point of the brazing material for a sufficient period of time to form on the surface of the diamonds a strongly adherent film containing tungsten carbide, raising the temperature of said mass and brazing material to a temperature of about 2050° to 2100° F. to melt said brazing material and cause the same to flow by capillarity into the interstices of said mass, and cooling to solidify the mass.

8. In the method of making diamond tools from a mixture consisting of tungsten metal particles and diamonds, the step of reacting said tungsten metal with the carbon of the diamonds at a temperature not over 2100° F. in the absence of any admixed bonding material and carbon to form on the surfaces of said diamonds a strongly adherent layer containing tungsten carbide.

9. In the method of making diamond tools from a mixture consisting of a compressed mass of hydrogen reduced tungsten metal particles and diamonds, the step of reacting said tungsten metal with the carbon of the diamonds in a hydrogen atmosphere at a temperature not over 2100° F. in the absence of any admixed bonding material and carbon to form on the surfaces of said diamonds a strongly adherent layer containing tungsten carbide.

JOHN L. PETRIE.